(12) United States Patent
Takahashi

(10) Patent No.: US 10,193,431 B2
(45) Date of Patent: Jan. 29, 2019

(54) LINEAR MOTOR

(71) Applicant: SANYO DENKI CO., LTD., Tokyo (JP)

(72) Inventor: Akihiko Takahashi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 206 days.

(21) Appl. No.: 14/631,068

(22) Filed: Feb. 25, 2015

(65) Prior Publication Data

US 2015/0244237 A1 Aug. 27, 2015

(30) Foreign Application Priority Data

Feb. 27, 2014 (JP) .................. 2014-037414

(51) Int. Cl.
| | | |
|---|---|---|
| H02K 7/00 | (2006.01) | |
| H02K 41/02 | (2006.01) | |
| H02K 41/03 | (2006.01) | |
| H02K 7/14 | (2006.01) | |
| H02K 9/22 | (2006.01) | |

(52) U.S. Cl.
CPC ............. *H02K 41/031* (2013.01); *H02K 7/14* (2013.01); *H02K 9/22* (2013.01); *H02K 2213/03* (2013.01)

(58) Field of Classification Search
CPC .... H02K 2213/03; H02K 41/031; H02K 7/14; H02K 9/22
USPC ...................................... 310/12.32
See application file for complete search history.

(56) References Cited

U.S. PATENT DOCUMENTS

| | | | | |
|---|---|---|---|---|
| 3,707,924 A | * | 1/1973 | Barthalon ................ | B60V 3/04 104/290 |
| 5,959,732 A | * | 9/1999 | Hara ................... | G03F 7/70716 356/401 |
| 6,084,319 A | * | 7/2000 | Kamata ............... | G03F 7/70691 310/12.06 |
| 6,323,567 B1 | * | 11/2001 | Hazelton ................ | H02K 9/19 310/12.29 |
| 6,495,935 B1 | * | 12/2002 | Mishler ............... | F16C 29/0614 310/12.04 |
| 7,355,308 B2 | * | 4/2008 | Hazelton ............ | G03F 7/70758 310/12.06 |

(Continued)

FOREIGN PATENT DOCUMENTS

| | | |
|---|---|---|
| EP | 2348617 A2 | 7/2011 |
| JP | 2011-200098 | 10/2011 |

(Continued)

OTHER PUBLICATIONS

Extended European Search Report dated Dec. 11, 2015 for the corresponding European Patent Application No. 15156876.3.

(Continued)

*Primary Examiner* — Alex W Mok
(74) *Attorney, Agent, or Firm* — Rankin, Hill & Clark LLP

(57) ABSTRACT

A linear motor includes a stator, a mover that moves a subject to be moved linearly along the stator, and a multi-member spacer that is interposed between the mover and the subject to be moved. The stator includes a plurality of permanent magnets, the mover includes a plurality of coils arranged to be opposed to the permanent magnets, and the multi-member spacer includes two or more members different in thermal conductivity.

14 Claims, 18 Drawing Sheets

(56) References Cited

U.S. PATENT DOCUMENTS

| | | | |
|---|---|---|---|
| 2004/0262999 A1* | 12/2004 | Yoshida | H02K 41/03 310/12.06 |
| 2005/0040712 A1* | 2/2005 | Hazelton | G03F 7/70758 310/58 |
| 2009/0184589 A1* | 7/2009 | Yamagishi | H04R 9/066 310/12.16 |
| 2009/0315414 A1* | 12/2009 | Shikayama | H02K 41/03 310/12.29 |
| 2011/0181130 A1 | 7/2011 | Yoshida et al. | |
| 2013/0140372 A1 | 6/2013 | Binnard | |
| 2013/0164687 A1 | 6/2013 | Coakley | |

FOREIGN PATENT DOCUMENTS

| | | |
|---|---|---|
| JP | 2013212024 A2 | 10/2013 |
| WO | 2008/152876 | 12/2008 |
| WO | 2013090123 A1 | 6/2013 |

OTHER PUBLICATIONS

Japanese Office Action dated Aug. 1, 2017 for the corresponding Japanese Patent Application No. 2014-037414.

\* cited by examiner

FIG. 5

| | SPACER NO. 1 | SPACER NO. 2 | SPACER NO. 3 |
|---|---|---|---|
| DIMENSIONS (mm) | 40 WIDE×84 LONG×11.7 THICK | 40 WIDE×84 LONG×11.7 THICK | 40 WIDE×84 LONG×11.7 THICK |
| MATERIAL | SYNTHETIC RESIN | STAINLESS STEEL | ALUMINUM ALLOY |
| MODEL NO. | PPS/GF4 | SUS304 | A5052 |
| THERMAL CONDUCTIVITY (W/m·K) | 0.3 | 16.7 | 137 |

FIG. 13

| | SPACER NO. 4 | SPACER NO. 5 |
|---|---|---|
| ENTIRE DIMENSIONS (mm) | 40 WIDE × 84 LONG × 11.7 THICK | 40 WIDE × 84 LONG × 11.7 THICK |
| MATERIAL | ALUMINUM ALLOY + STAINLESS STEEL | ALUMINUM ALLOY + STAINLESS STEEL + SYNTHETIC RESIN |
| MODEL NO. | A5052 + SUS304 | A5052 + SUS304 + PPS/GF4 |

FIG. 17

| ENTIRE DIMENSIONS (mm) | SPACER NO. 4 | SPACER NO. 6 |
|---|---|---|
| | 40 WIDE × 84 LONG × 11.7 THICK | 40 WIDE × 84 LONG × 11.7 THICK |
| MATERIAL | ALUMINUM ALLOY + STAINLESS STEEL | ALUMINUM ALLOY + STAINLESS STEEL |
| MODEL NO. | A5052 + SUS304 | A5052 + SUS304 |

LINEAR MOTOR

CROSS-REFERENCE TO RELATED APPLICATION

This application claims priority from Japanese Patent Application No. 2014-037414 filed with the Japan Patent Office on Feb. 27, 2014, the entire content of which is hereby incorporated by reference.

BACKGROUND

1. Technical Field

The subject disclosure relates to a linear motor.

2. Description of the Related Art

A mover in a linear motor with a cooling structure for mover coils is attached to a subject to be moved such as a stage. The mover (armature) has coils. The temperature of the coils increases as the linear motor operates.

Therefore, when the mover is directly attached to the subject to be moved, the subject to be moved is thermally expanded with an increase in the temperature of the coils. When the subject to be moved is thermally expanded, linear guides for guiding linear motion of the subject to be moved are put under load. This shortens the life of the linear guides.

Conventionally, a spacer made of a material with a low thermal conductivity has been interposed between the subject to be moved and the mover to suppress heat transfer to the subject to be moved. Such a structure for indirectly attaching the mover has been employed.

As a technique related to the structure for indirectly attaching the mover to the subject to be moved, for example, there has been disclosed a linear motor in which a top plate is fixed through a fastener bar and a heat insulator to the upper portion of the mover to form a ventilation flue between the upper portion of the mover and the lower portion of the top plate (refer to JP-A-2013-212024).

SUMMARY

A linear motor includes a stator, a mover that moves a subject to be moved linearly along the stator, and a multi-member spacer that is interposed between the mover and the subject to be moved. The stator includes a plurality of permanent magnets, the mover includes a plurality of coils arranged to be opposed to the permanent magnets, and the multi-member spacer includes two or more members different in thermal conductivity.

BRIEF DESCRIPTION OF THE DRAWINGS

FIG. 5 is an illustrative diagram of the dimensions, materials, and thermal conductivities of single-member spacers;

FIG. 13 is an illustrative diagram of multi-member spacers included in the linear motor according to the first embodiment;

FIG. 17 is an illustrative diagram of a multi-member spacer No. 6 including members different in shape and thermal conductivity.

DESCRIPTION OF THE EMBODIMENTS

Figure 1:
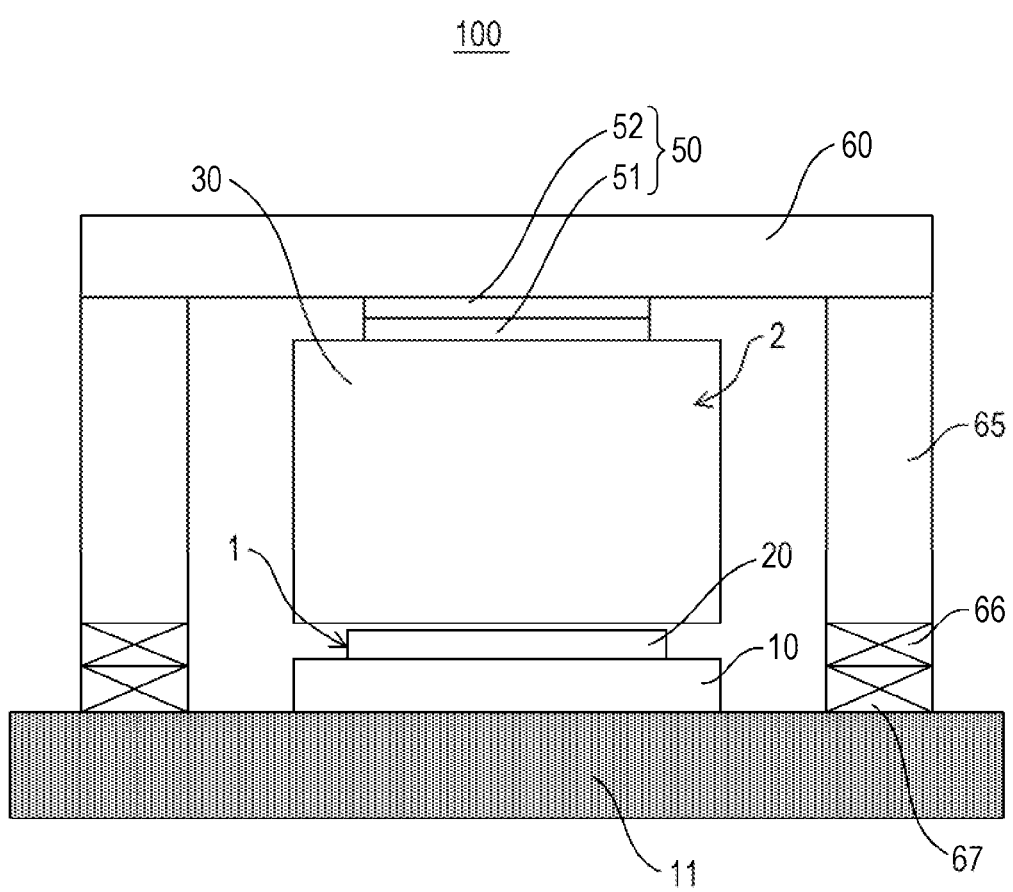
FIG. 1 is a schematic front view of an example of a linear motor according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to the conventional structure in which the mover is attached to the subject to be moved via the spacer including a member with a low thermal conductivity, it is possible to suppress an increase in the temperature of the subject to be moved. However, it is difficult to reduce an increase in the temperature of the coils.

The structure disclosed in JP-A-2013-212024 has been employed to suppress heat transfer to the top plate (subject to be moved) by the heat insulator and cool down the coils in the mover by the ventilation flue.

However, the ventilation flue does not sufficiently perform the cooling function without an air-blowing unit such as a fan. The provision of the air-blowing unit makes it difficult to reduce the linear motor in size and weight. This leads to upsizing and weight increase of the subject to be moved. Therefore, the air-blowing unit may deteriorate the linear motor in continuous operation characteristics.

An object of the subject disclosure is to provide a linear motor that has a simple structure, suppresses an increase in the temperature of the subject to be moved, and reduces an increase in the temperature of the coils in the mover.

To attain the foregoing object, a linear motor according to the present disclosure includes a stator, a mover that moves a subject to be moved linearly along the stator, and a multi-member spacer that is interposed between the mover and the subject to be moved. The stator includes a plurality of permanent magnets, the mover includes a plurality of coils arranged to be opposed to the permanent magnets, and the multi-member spacer includes two or more members different in thermal conductivity.

The linear motor according to the embodiment of the subject disclosure includes a multi-member spacer with two or more members different in thermal conductivity interposed between the subject to be moved and the mover. The two or more members included in the spacer have different thermal conductivities. This increases the number of parameters for adjusting thermal resistance between the coils in the mover and the subject to be moved.

Increasing the number of thermal resistance parameters makes it possible to determine the optimum value of thermal resistance between the coils and the subject to be moved. That is, it is possible to widen the adjustable range of the amount of heat to be transferred from the coils to the subject to be moved. Accordingly, the increase in the temperature of the subject to be moved satisfies required specifications. It is also possible to reduce an increase in the temperature of the mover coils.

Therefore, the linear motor according to the embodiment of the subject disclosure has a simple structure, suppresses an increase in the temperature of the subject to be moved, and reduces an increase in the temperature of the coils in the mover.

Linear motors according to first and second embodiments will be described below with reference to the accompanying drawings.

Each of the linear motors according to the first and second embodiments includes a multi-member spacer with two or more members different in thermal conductivity interposed between the subject to be moved and the mover. This increases the number of parameters for adjusting thermal resistance between the coils in the mover and the subject to be moved in the linear motor. As a result, it is possible to determine the optimum value of thermal resistance between the coils and the subject to be moved. It is also possible to widen the adjustable range of the amount of heat to be transferred from the coils to the subject to be moved.

Therefore, according to the first and second embodiments, it is possible to realize the linear motor that has a simple structure, suppresses an increase in the temperature of the subject to be moved, and reduces an increase in the temperature of the coils in the mover.

[First Embodiment]
[Configuration of the Linear Motor]

Figure 2:
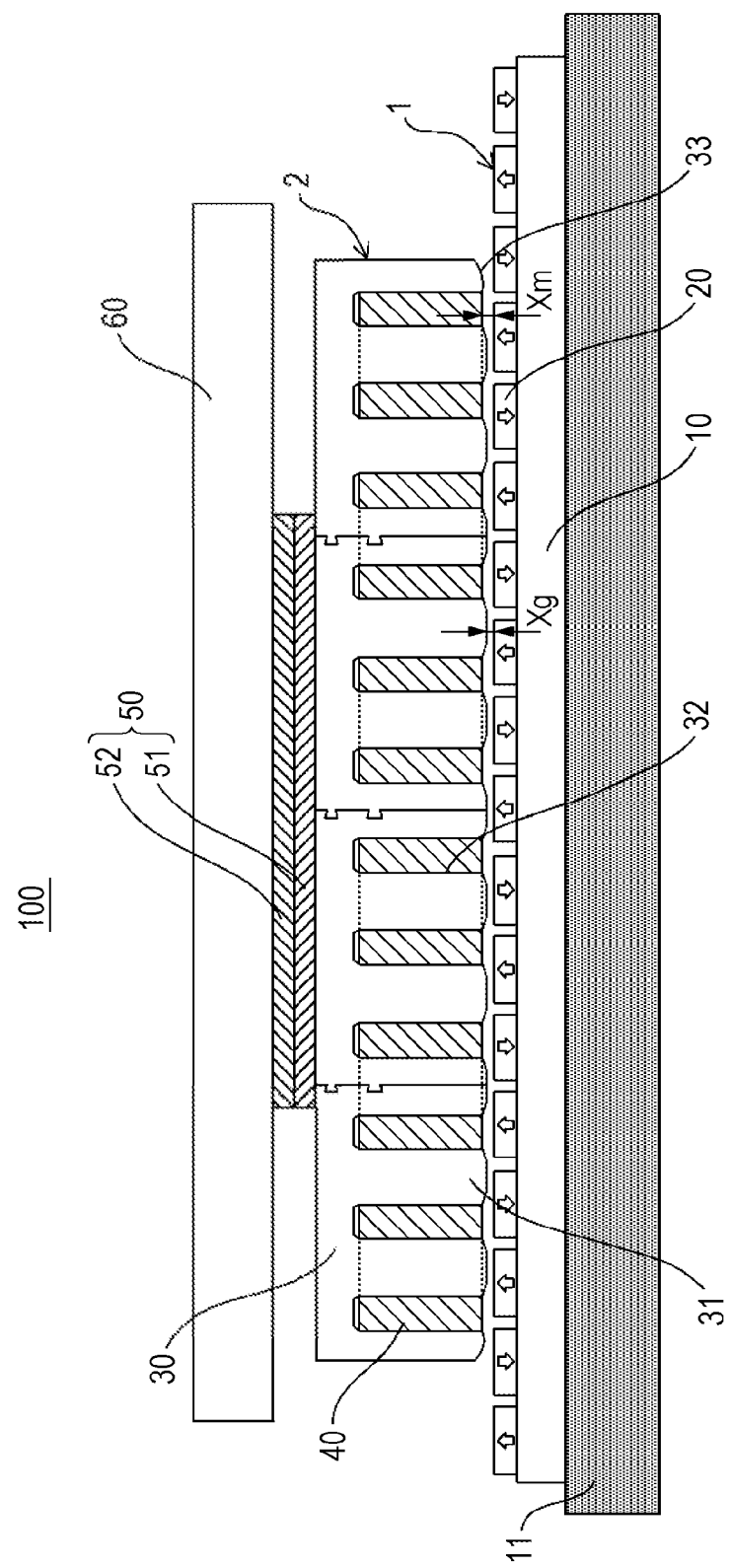
FIG. 2 is a schematic cross-sectional view of the example of the linear motor according to the first embodiment.
Figure 3:
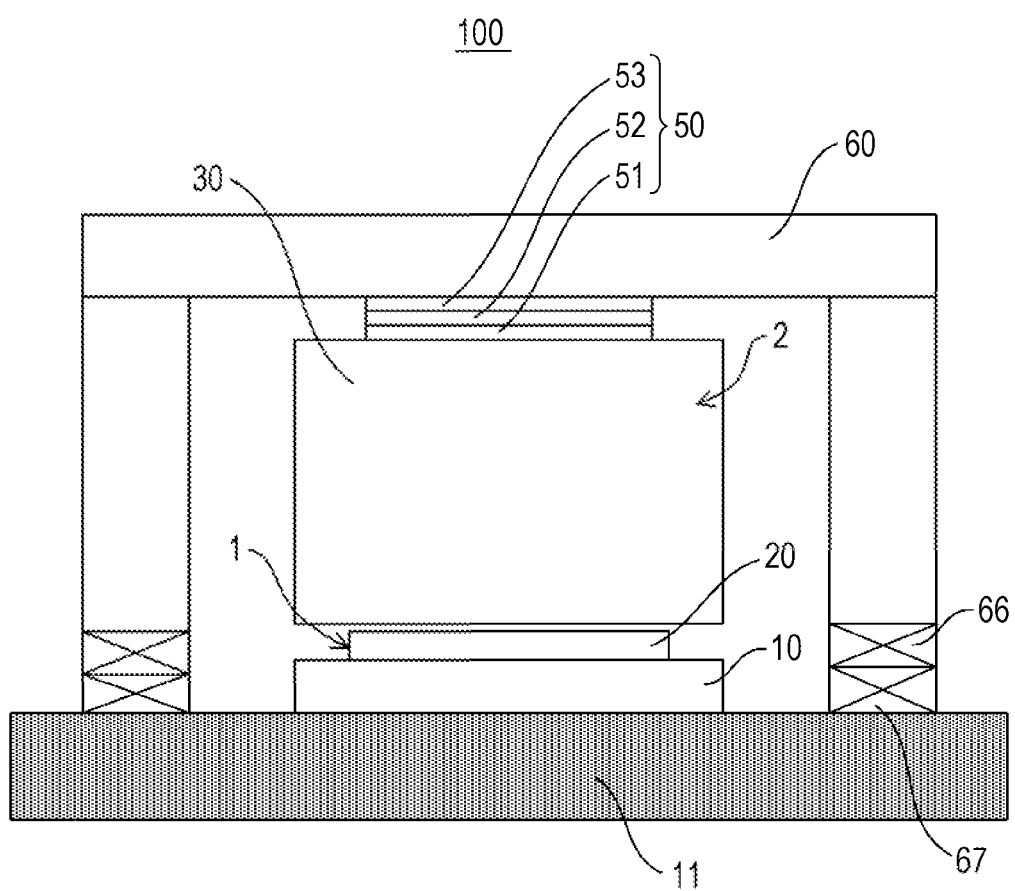
FIG. 3 is a schematic front view of another example of a linear motor according to the first embodiment.
Figure 4:
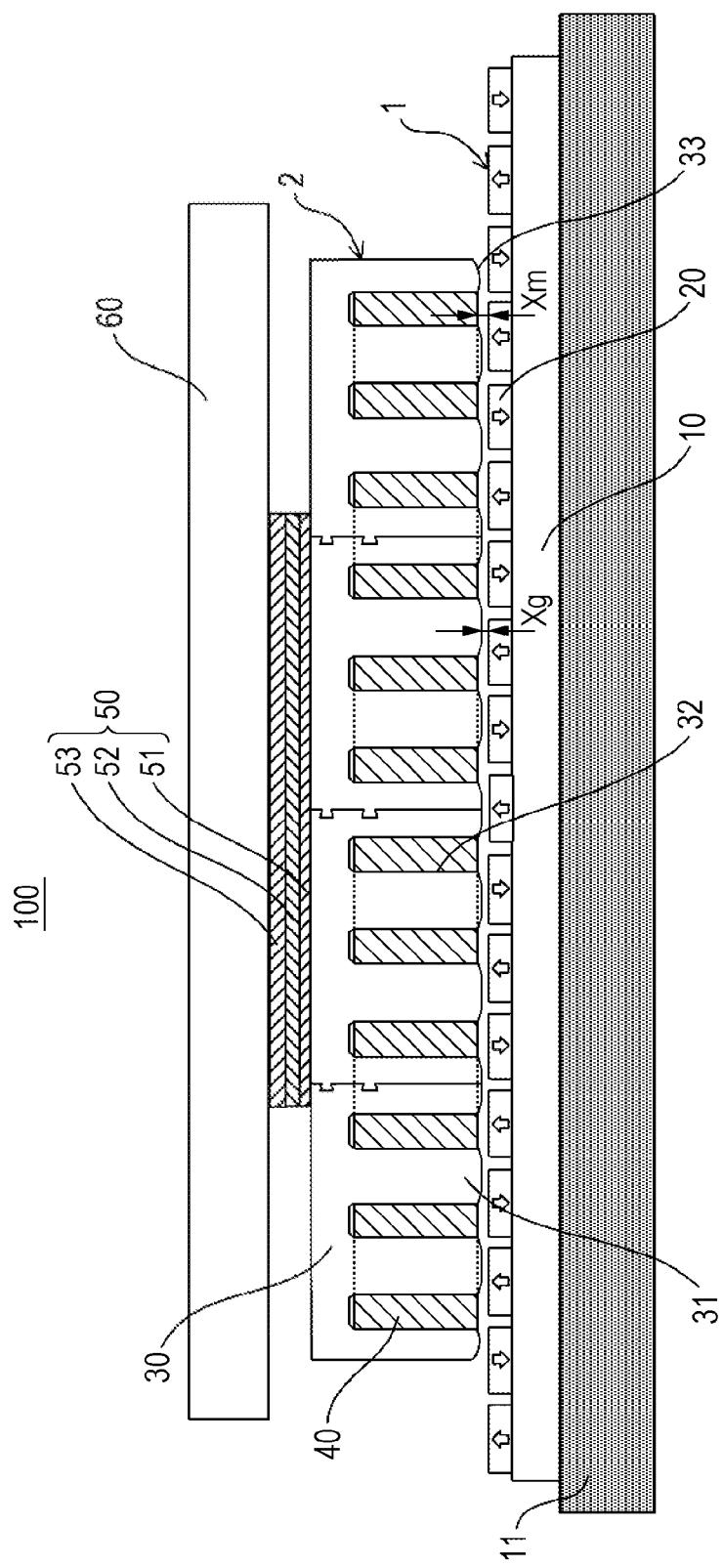
FIG. 4 is a schematic front view of the other example of the linear motor according to the first embodiment.

First, a configuration of the linear motor according to the first embodiment will be described with reference to FIGS. 1 and 2. FIG. 1 is a schematic front view of an example of the linear motor according to the first embodiment. FIG. 2 is a schematic cross-sectional view of the example of the linear motor according to the first embodiment. FIG. 3 is a schematic front view of another example of the linear motor according to the first embodiment. FIG. 4 is a schematic cross-sectional view of the example of the linear motor according to the first embodiment.

As illustrated in FIGS. 1 to 4, the linear motor 100 in the first embodiment includes a field magnet unit 1 and an armature 2.

The field magnet unit 1 has a yoke 10 and permanent magnets 20. The field magnet unit 1 acts as a stator.

The yoke 10 is a plate-like magnetic metal member. The yoke 10 is fixed to a base 11 disposed along the moving direction of the linear motor 100.

The yoke 10 has the function of closing magnetic lines of force from the field magnet unit 1 toward the base 11. This maximizes the effect of electromagnetic induction of the permanent magnets 20. The material for the yoke 10 may be an iron-based magnetic body such as an SC material, for example. However, the material for the yoke 10 is not limited to the foregoing one.

The plurality of permanent magnets 20 is disposed on the yoke 10 along the longitudinal direction of the yoke 10 (the moving direction of the linear motor 100). The plurality of permanent magnets 20 is arranged with a predetermined space from each other such that the adjacent permanent magnets 20 and 20 are different in surface polarity (N, S, N, S, . . . ).

The armature 2 has a core 30 and coils 40. The armature 2 acts as a mover.

The core 30 is a member that constitutes the main body of the armature 2. The core 30 has on its lower portion a plurality of teeth 31 protruded toward the permanent magnets 20. That is, the teeth 31 are coupled together at the base end side via the core 30.

The teeth 31 are members that determine slots 32 as spaces for storing the coils 40. That is, the armature 2 has the plurality of concave slots 32 arranged in parallel in the longitudinal direction with the teeth 31 therebetween.

The upper portions of the slots 32 are closed by the core 30. The lower portions of the slots 32 are opened. The number of the slots 32 corresponds to the number of the coils 40.

The core 30 and the teeth 31 are composed of electromagnetic steel plates, for example. The teeth 31 are magnetic bodies. Therefore, the clearance between the teeth surface and the magnet surface of the field magnet unit 1 constitutes a magnetic gap Xg.

The teeth 31 at the both longitudinal ends may have tapered portions 33 to reduce cogging (oscillations caused by the change of magnetic flux between the field magnet unit 1 and the teeth 31) during linear motion.

The coils 40 are wound around every other tooth 31 to surround the same. The coils 40 are opposed to the permanent magnets 20 of the field magnet unit 1 with a mechanical gap Xm therebetween.

A stage 60 as a subject to be moved is fixed to the core 30 via a multi-member spacer 50 described later, for example. The stage 60 may be fixed to the core 30 by screwing bolts (not illustrated) into nuts (not illustrated) embedded into the upper surface of the core 30 via the plate-like multi-member spacer 50, for example.

Therefore, the multi-member spacer 50 has through holes (not illustrated) into which the bolts are inserted. The foregoing fixation structure of the armature 2 and the multi-member spacer 50 to the stage 60 is merely an example. Therefore, the fixation structure is not limited to the structure disclosed in the first embodiment.

The multi-member spacer 50 includes two or more plate-like spacers different in thermal conductivity.

In the example of FIGS. 1 and 2, the multi-member spacer 50 includes two plate-like spacers 51 and 52 different in thermal conductivity.

Specifically, the material for the spacer 51 on the armature 2 side is an aluminum alloy (JIS A5052), for example. The thermal conductivity of A5052 is 137 W/m·K.

Meanwhile, the material for the spacer 52 on the stage 60 side is a stainless steel (JIS SUS304), for example. The thermal conductivity of SUS304 is 16.7 W/m·K.

In the example of FIGS. 3 and 4, the multi-member spacer 50 includes three plate-like spacers 51, 52, and 53 different in thermal conductivity.

Specifically, the material for the spacer 51 on the armature 2 side is the aluminum alloy (JIS A5052), for example. The thermal conductivity of A5052 is 137 W/m·K.

The material for the intermediate spacer 52 is the stainless steel (JIS SUS304), for example. The thermal conductivity of SUS304 is 16.7 W/m·K.

The material for the spacer 53 on the stage 60 side is a synthetic resin (PPS/GF4: fiber-reinforced polyphenylene sulfide), for example. The thermal conductivity of PPS/GF4 is 0.3 W/m·K.

The external dimensions of the spacers 51, 52, and 53 are set to be smaller than the external dimensions of the armature 2. The members included in the multi-member spacer 50 are arranged in such a manner that the thermal conductivity of the multi-member spacer 50 decreases sequentially from the armature (mover) 2 to the stage (subject to be moved) 60.

The materials for the spacers 51, 52, and 53 different in thermal conductivity are merely examples. The materials for the same are not limited to the foregoing ones.

Legs 65 are extended downward from the both ends of the stage 60 separated in the width direction (orthogonal to the moving direction of the linear motor 100). Linear guides 66 are fixed to the lower portions of the legs 65. The linear guides 66 are formed in a downward concave shape to engage with convex track 67 on the base 11. The convex track 67 is extended along the moving direction of the linear motor 100.

[Operations of the Linear Motor]

Next, operations of the linear motor 100 according to the first embodiment will be described with reference to FIGS. 1 to 14.

As described above with reference to FIGS. 1 to 4, the linear motor 100 in the first embodiment includes the field magnet unit 1 and the armature 2. The field magnet unit 1 includes a plurality of permanent magnets 20 that is arranged along the moving direction (longitudinal direction) of the linear motor 100. The plurality of permanent magnets 20 is arranged in such a manner that the adjacent permanent magnets 20 and 20 are different in surface polarity (N, S, N, S, . . . ).

Meanwhile, the armature 2 has a plurality of coils 40 opposed to the permanent magnets 20 of the field magnet unit 1. The plurality of coils 40 is aligned along the longitudinal side of the linear motor 100.

The field magnet unit 1 serves as a stator. The armature 2 in the embodiment serves as a mover. Specifically, in the linear motor 100 of the embodiment, electric current flowing into the coils 40 of the armature 2 crosses magnetic flux produced by the permanent magnets 20 of the field magnet unit 1. At the linear motor 100 in the embodiment, when the magnetic flux of the permanent magnets 20 crosses the electric current flowing into the coils 40 of the armature 2, a driving force is longitudinally generated in the coils 40 by the action of electromagnetic induction. As a result, the armature 2 is moved along the longitudinal direction.

The stage 60 as a subject to be moved is linearly moved by the armature (mover) 2. The linear guides 66 are fixed to the lower portions of the legs 65 at the both ends of the stage 60 separated in the width direction. The linear guides 66 are engaged with the convex track 67 fixed to the base 11 and moved onto the convex track 67. The stage 60 is guided by the linear guides 66 along the convex track 67.

Therefore, an application disposed on the stage 60, such as a processing device, for example, can be moved smoothly together with the stage 60 along the longitudinal direction.

The temperature of the coils 40 in the armature 2 increases with operation of the linear motor 100. When the temperature of the coils 40 increases, the stage 60 is thermally expanded to apply a load to the linear guides 66. Thus, it is important to suppress an increase in the temperature of the stage 60 to lengthen the lifetime of the linear guides 66.

<Changes in Temperature of Conventional Single-member Spacer>

Hereinafter, changes of increase in the temperature of a conventional linear motor will be discussed. At the conventional linear motor, a spacer including a single member (hereinafter, referred to as single-member spacer) is interposed between an armature and a stage. Thus, the optimum material for the single-member spacer has been sought for. However, there is a limitation in the usable materials for the single-member spacer due to restrictions on mechanical strength, processability, costs, and the like. The actually usable materials for the single-member spacer are synthetic resins, stainless steels, and aluminum alloys, for example.

Figure 6:
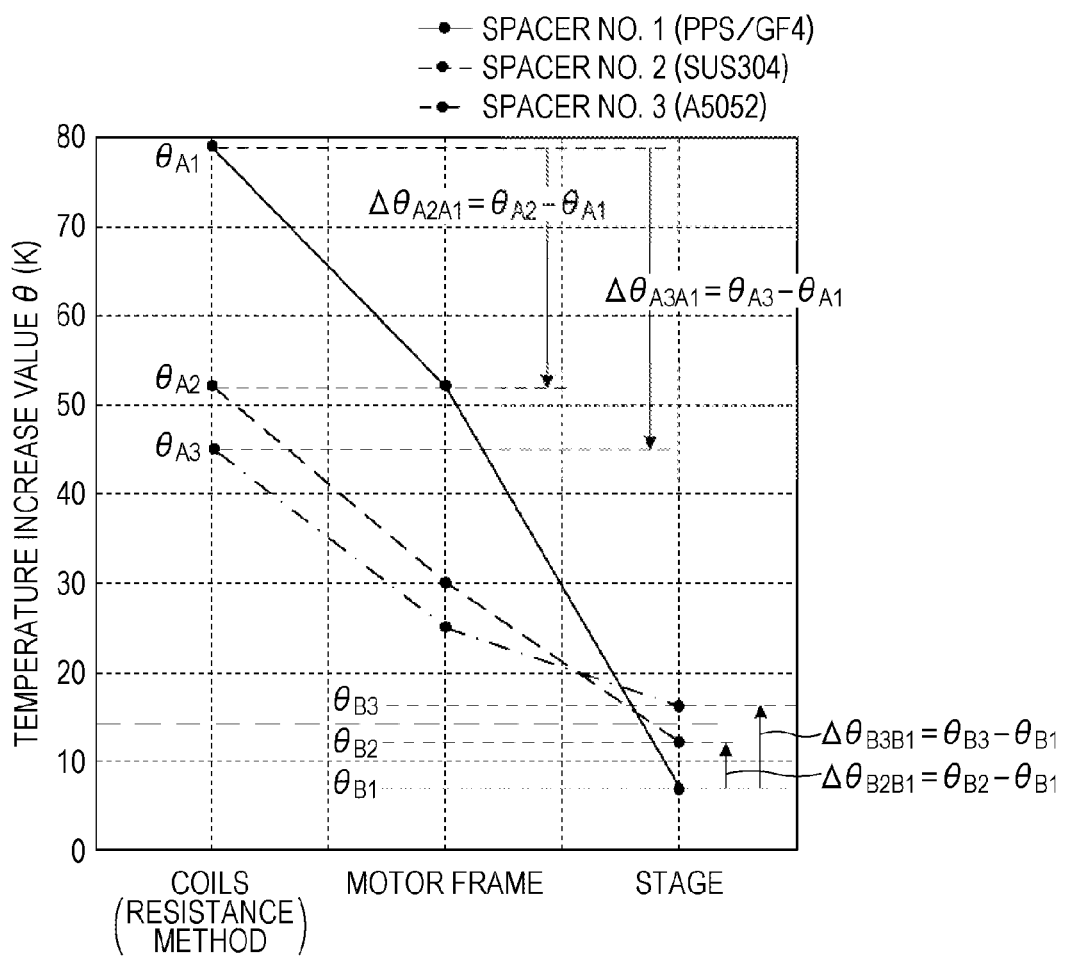
FIG. 6 is an illustrative diagram of temperature changes in a conventional linear motor in which the materials for the single-member spacers are altered.

FIG. 5 is an illustrative diagram of the dimensions, materials, and thermal conductivities of single-member spacers. FIG. 6 is an illustrative diagram of changes in temperature of a conventional linear motor in which the materials for the single-member spacers are altered.

Referring to FIGS. 5 and 6, when a spacer No. 1, a spacer No. 2, and a spacer No. 3 are used as single-member spacers, the coil has temperature increase values designated as $\theta_{A1}$, $\theta_{A2}$, and $\theta_{A3}$. In addition, the stage has temperature increase values designated as $\theta_{B1}$, $\theta_{B2}$, and $\theta_{B3}$.

When a single-member spacer is replaced from the spacer No. 1 to the spacer No. 2, the amount of heat lost by the coils and the amount of heat obtained by the stage are expressed by the following equation (1) and equation (2), respectively, on the assumption that the amount of change in increase of temperature of the coils is designated as $\Delta\theta_{A2A1}$, and the amount of change in increase of temperature of the stage as $\Delta\theta_{B2B1}$:

The amount of heat lost by the coils (high-temperature object): $Q_{A1A2} = M1 \cdot C1 \cdot (\eta_{A2} - \theta_{A1})$ \hfill (1)

The amount of heat obtained by the stage (low-temperature object): $Q_{B1B2} = M2 \cdot C2 \cdot (\theta_{B2} - \theta_{B1})$ \hfill (2)

where M1 and M2 represent the masses of the coils and the stage (kg), and C1 and C2 represent the specific heat of the coils and the stage (J/kg·K).

From the law of conservation of heat, the amount of heat lost by the high-temperature object is equal to the amount of heat obtained by the low-temperature object, and the following equation holds:

$$Q_{A1A2} = -Q_{B1B2} \qquad (3)$$

Therefore, when a single-member spacer is replaced from the spacer No. 1 to the spacer No. 2, the change in the temperature of the stage is expressed by the following equation (4):

$$\Delta\theta_{B2B1} = (\theta_{B2} - \theta_{B1}) = \left(-\frac{M_1 \times C_1}{M_2 \times C_2}\right) \times (\theta_{A2} - \theta_{A1}) \qquad (4)$$

In addition, $R_{\theta A1B1}$ is defined as thermal resistance from the coils to the stage with the spacer No. 1 as a single-member spacer, and $R_{\theta A2B2}$ is defined as thermal resistance from the coils to the stage with the spacer No. 2 as a single-member spacer. Accordingly, the thermal resistances are expressed by the following equations (5) and (6), respectively, using thermal conductivity λ determined by the material for the spacer, surface area S of the spacer, and thickness L of the spacer:

Thermal resistance from the coils to the stage with the spacer No. 1 as a single-member spacer $$R_{\theta A1B1} = \frac{L_1}{\lambda_1 \cdot S_1} \quad (5)$$

where the surface area of the spacer No. 1 is designated as S1 (m$^2$), the thickness of the same as L1 (m), and the thermal conductivity of the material for the same as λ1 (W/m·K).

Thermal resistance from the coils to the stage with the spacer No. 2 as a single-member spacer $$R_{\theta A2B2} = \frac{L_2}{\lambda_2 \cdot S_2} \quad (6)$$

where the surface area of the spacer No. 2 is designated as S2 (m$^2$), the thickness of the same as L2 (m), and the thermal conductivity of the material for the same as λ2 (W/m·K).

When a single-member spacer is replaced from the spacer No. 1 to the spacer No. 2, the amount of change in temperature increase value of the coils is expressed by the following equation (7) derived from the equations (5) and (6):

$$\Delta\theta_{A2A1} = (\theta_{A2} - \theta_{A1}) = (R_{\theta A2B2} - R_{\theta A1B1}) \times Q = \left(\frac{1}{\lambda_2} - \frac{1}{\lambda_1}\right) \times \left(\frac{L_1}{S_1}\right) \times Q \quad (7)$$

Meanwhile, when a single-member spacer is replaced from the spacer No. 1 to the spacer No. 2, the amount of change in temperature increase value of the stage is expressed by the following equation (8) obtained by substituting the equation (7) into the equation (4):

$$\Delta\theta_{B2B1} = (\theta_{B2} - \theta_{B1}) = \left(-\frac{M_1 \cdot C_1}{M_2 \cdot C_2}\right)\left(\frac{1}{\lambda_2} - \frac{1}{\lambda_1}\right) \times \left(\frac{L_1}{S_1}\right) \times Q \quad (8)$$

In general, at a device where the linear motor is used, the external dimensions of the stage are much larger than the external dimensions of the coils. That is, the heat capacity M2·C2 of the stage is much larger than the heat capacity M1·C1 of the coils (M1·C1<<M2·C2).

Therefore, referring to FIG. 6 and the equations (7) and (8), it can be understood that, when a single-member spacer is replaced from the spacer No. 1 to the spacer No. 2, the amount of change $\Delta\theta_{B2B1}$ in temperature increase value of the stage is smaller than the amount of change $\Delta\theta_{A2A1}$ of temperature increase value of the coils. That is, it can be understood that the amount of change in temperature increase value of the stage depends on the difference between the heat capacity of the coils and the heat capacity of the stage.

From the viewpoint of prevention of temperature increase in the stage, the spacer No. 1 with lower thermal conductivity may be employed. The use of the spacer No. 1 makes it possible to suppress an increase in the temperature of the stage by high heat insulation. However, the heat of the coils is hardly released. Accordingly, it is not possible to reduce an increase in the temperature of the coils with the spacer No. 1.

Figure 7:
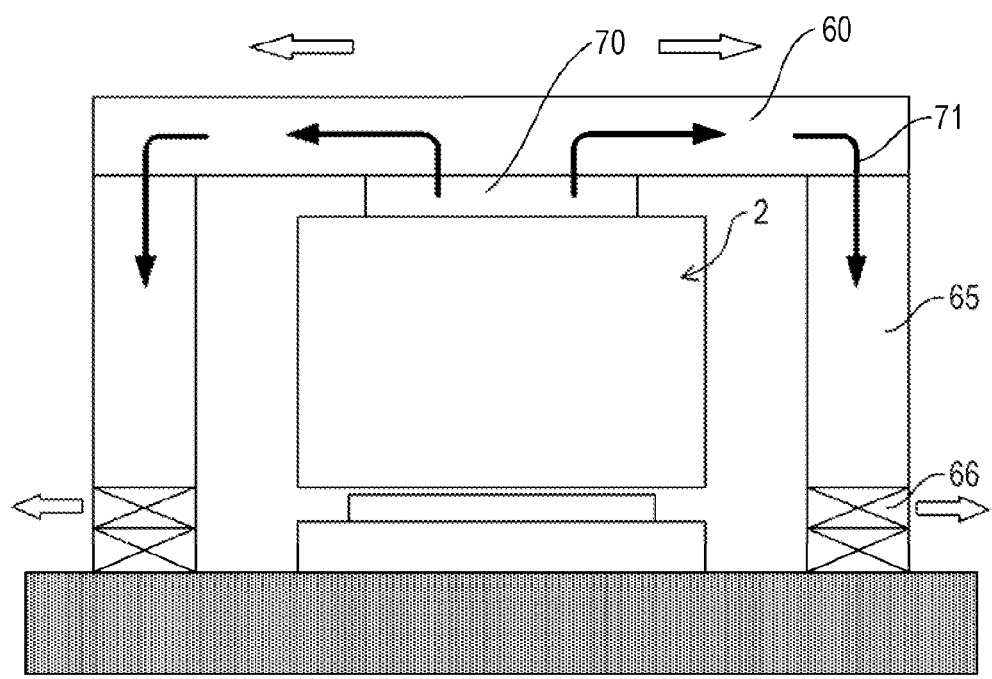
FIG. 7 is a schematic front view of a linear motor including a conventional single-member spacer interposed.

Therefore, it is conceived that a spacer with higher thermal conductivity such as the spacer No. 3 is more advantageous. FIG. 7 is a schematic front view of a linear motor with a conventional single-member spacer interposed.

As illustrated in FIG. 7, a conventional linear motor 300 includes a single-member spacer 70 interposed between the armature 2 and the stage 60. When the spacer No. 3 with a higher thermal conductivity is employed as the single-member spacer 70, the heat of the coils in the armature 2 is released to the stage 60 as indicated by arrows 71. This reduces an increase in the temperature of the coils.

However, when the heat of the coils is transferred to the stage 60, the stage 60 is thermally expanded. The thermal expansion of the stage 60 applies a load to the linear guides 66. Accordingly, the use of the spacer No. 3 cannot satisfy customer's required specifications.

Therefore, it is important in selecting the material for the spacer to satisfy customer's required specifications and reduce the temperature increase value of the coils. Thus, the goal is to maintaining the temperature increase value of the stage with the spacer No. 1 or the spacer No. 2 and bringing the temperature increase value of the coils with the spacer No. 1 or the spacer No. 2 closer to the temperature increase value of the coils with the spacer No. 3.

In many cases, however, the actually usable materials are limited to the synthetic resin (PPS/GF4), the stainless steel (SUS304), and the aluminum alloy (A5052) illustrated in FIG. 5 due to restrictions on mechanical strength, processability, costs, and the like.

The external dimensions of the spacer are subject to restrictions (thickness, width, and length of the spacer) due to the allowable range of dimensions for a customer's device. Thus, when the material for the single-member spacer is only one of the foregoing three materials, it is very difficult to adjust thermal resistance from the coils to the stage to keep the temperature increase value of the stage within the customer's required specifications and reduce the temperature increase value of the coils.

<Multi-member Spacer>

The linear motor 100 according to the first embodiment includes the multi-member spacer 50 including two members different in thermal conductivity interposed between the armature 2 and the stage 60, as illustrated in FIGS. 1 and 2. The external dimensions (width, length, and thickness) of the entire spacer 50 are the same as those of the spacers No. 1 to No. 3 illustrated in FIG. 5.

Of the spacer 50, the material for the spacer 51 arranged on the armature 2 side is an aluminum alloy (A5052), for example, and the material for the spacer 52 arranged on the stage 60 side is a stainless steel (SUS34), for example.

Figure 8:
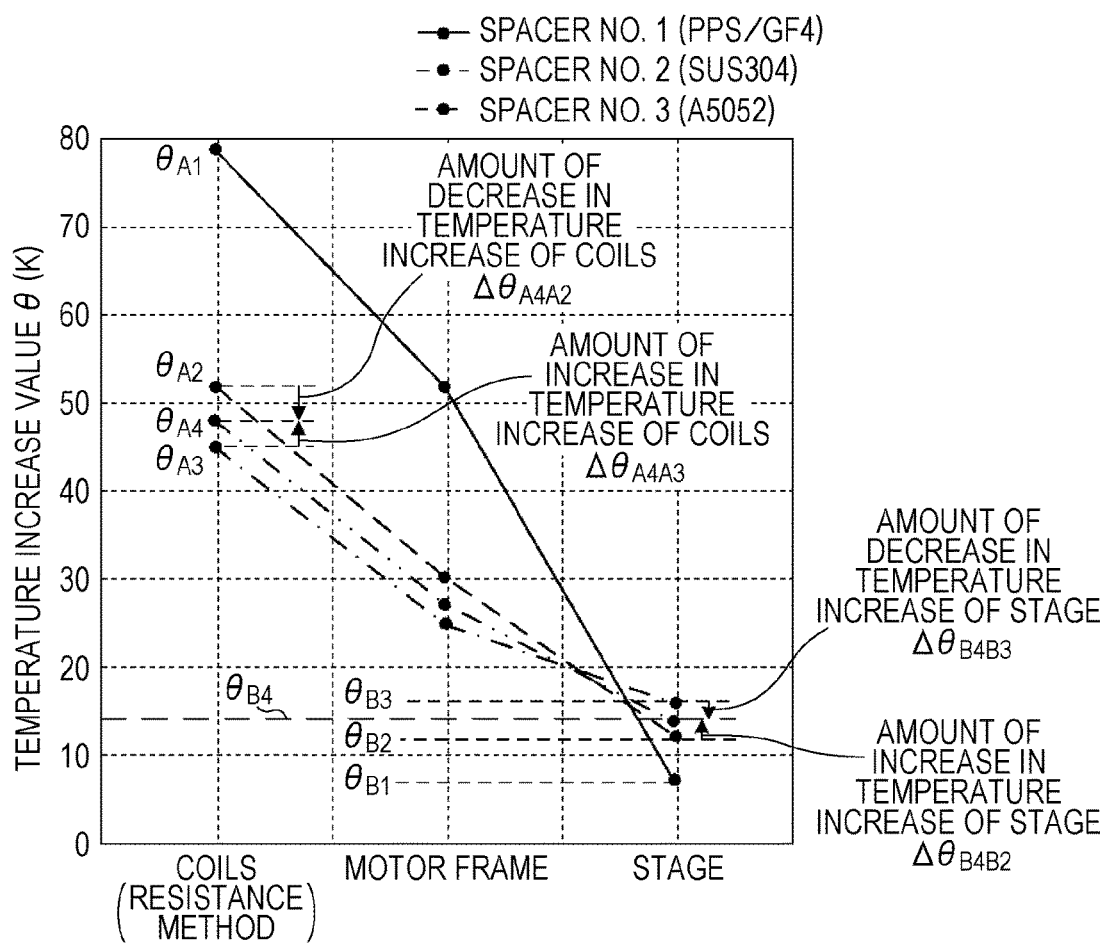
FIG. 8 is an illustrative diagram of temperature changes in the linear motor according to the first embodiment including two spacers different in thermal conductivity interposed between the armature and the stage.

FIG. 8 is an illustrative diagram of temperature changes in the linear motor according to the first embodiment including two spacers different in thermal conductivity interposed between the armature and the stage. FIG. 8 represents temperature changes in the coils, motor frame, and stage of the linear motor including the single-member spacers No. 1 to No. 3 for comparison.

As illustrated in FIG. 8, since the spacer including two members different in thermal conductivity is interposed between the armature and the stage, the number of parameters for adjusting thermal resistance from the coils to the stage (thermal conductivity and thicknesses of the materials) is increased. The increase in the number of the thermal resistance parameters brings about controllable temperature increase and decrease widths $\Delta\theta_{A4A2}$ and $\Delta\theta_{B4B2}$.

By controlling the minute increase and decrease widths $\Delta\theta_{A4A2}$ and $\Delta\theta_{B4B2}$, the multi-member spacer 50 increases the temperature increase value of the stage as compared to the case with the single-member spacer No. 2 ($\theta_{A2}$, $\theta_{B2}$). As a result, the temperature increase value of the stage increases close to the upper limit for the customer required specifications. Instead of this, the temperature increase value of the coils decreases ($\Delta\theta_{A4A2}$) close to $\theta_{A3}$.

In addition, the temperature increase value of the stage decreases as compared to the case with the single-member spacer No. 3. As a result, the temperature increase value of the stage can be decreased to the customer's required specifications.

<Temperature Changes in Multi-member Spacer>

Figure 9:
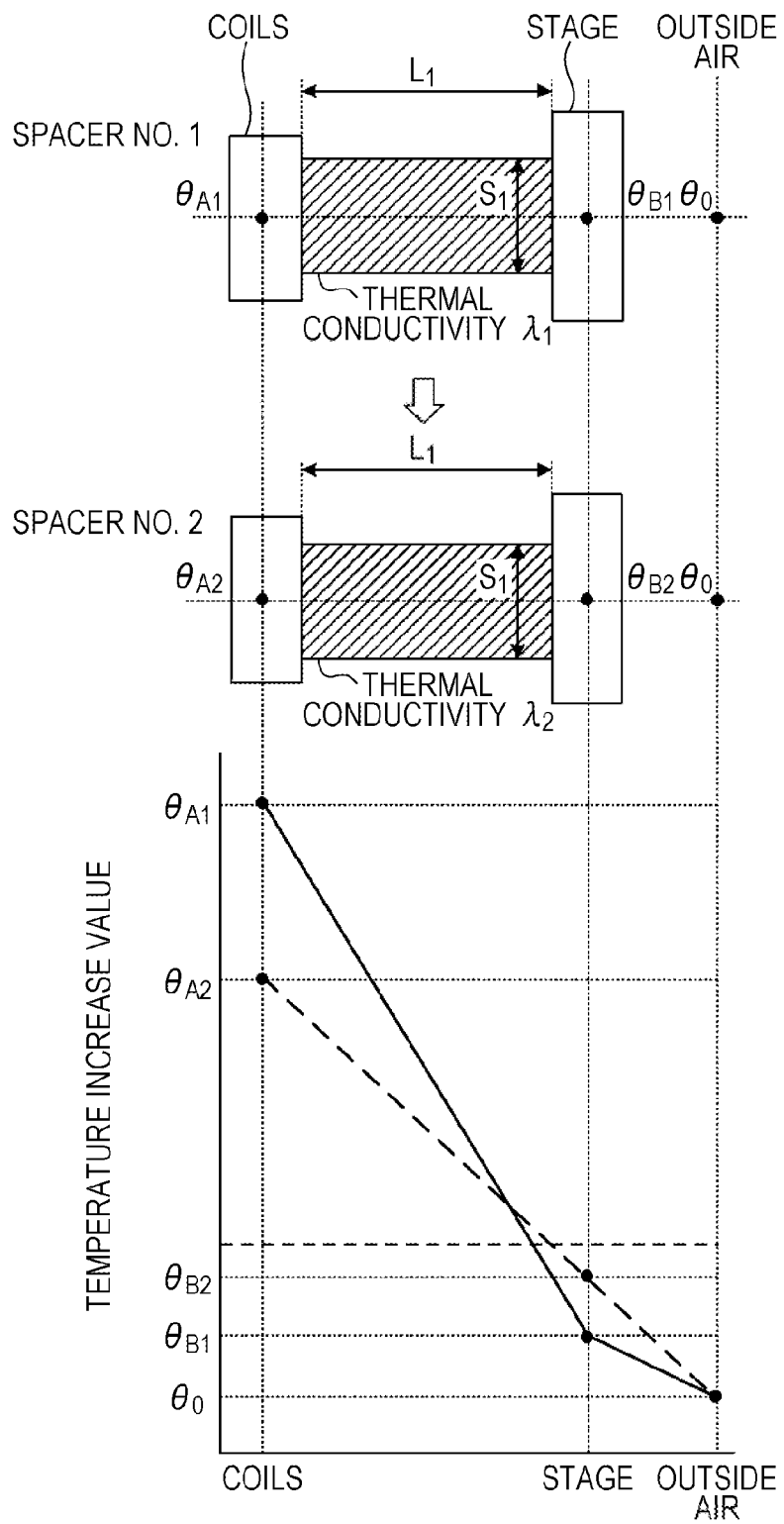
FIG. 9 is an illustrative diagram of temperature changes with a replacement of a spacer No. 1 (single member) by a spacer No. 2 (single member)
Figure 10:
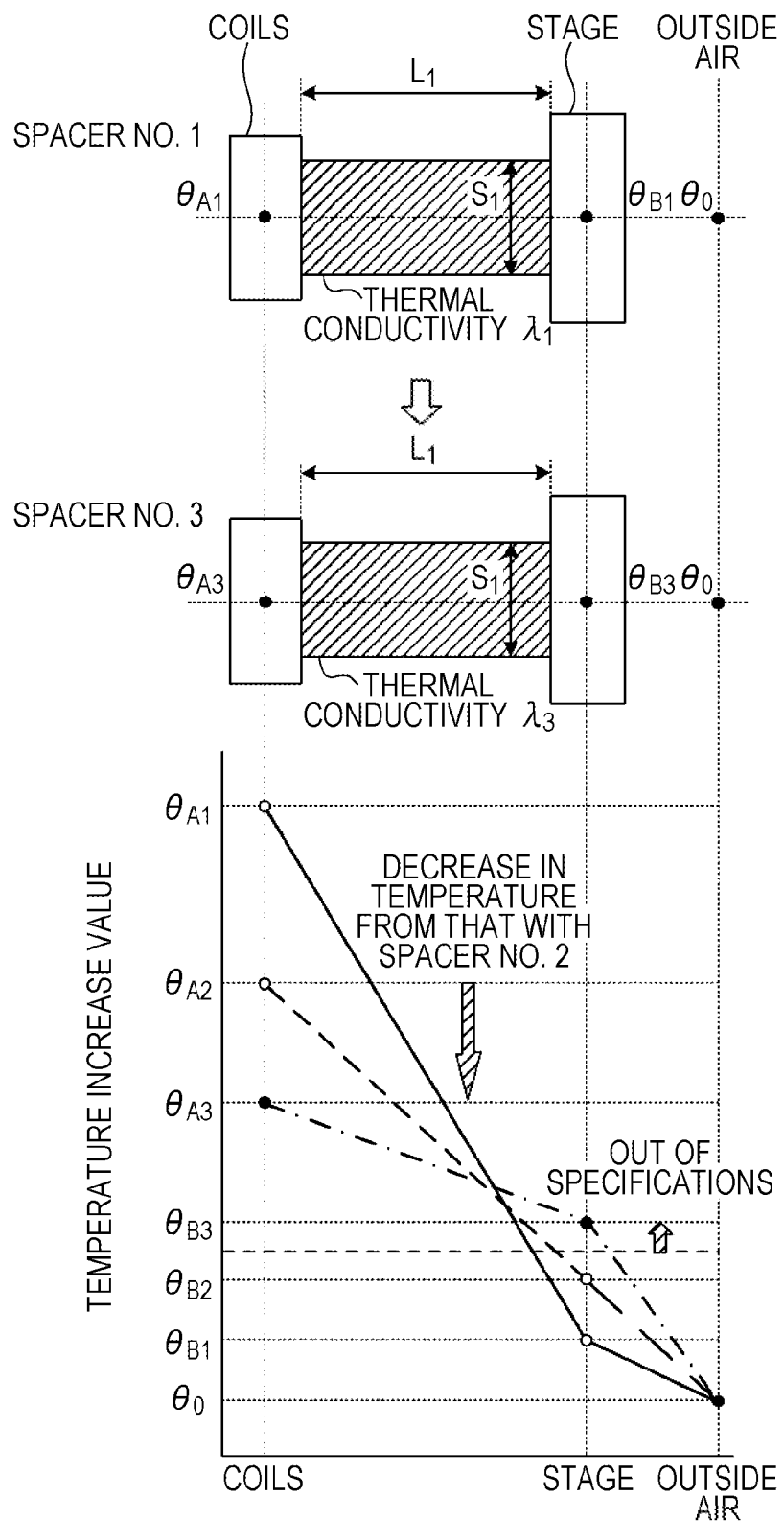
FIG. 10 is an illustrative diagram of temperature changes with a replacement of the spacer No. 1 (single member) by a spacer No. 3 (single member)
Figure 11:
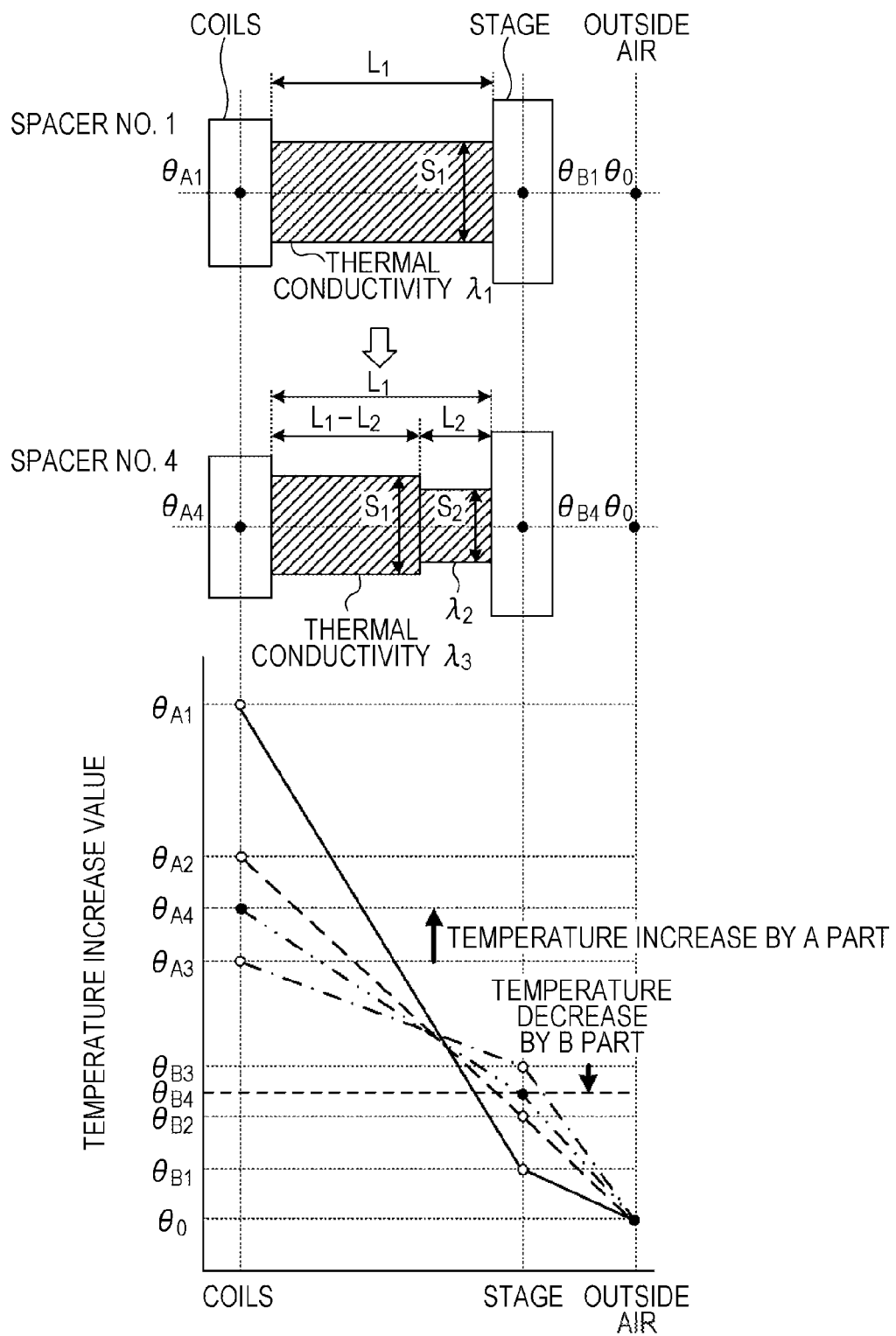
FIG. 11 is an illustrative diagram of temperature changes with a replacement of the spacer No. 1 (single member) by a spacer No. 4 (two members)
Figure 12:
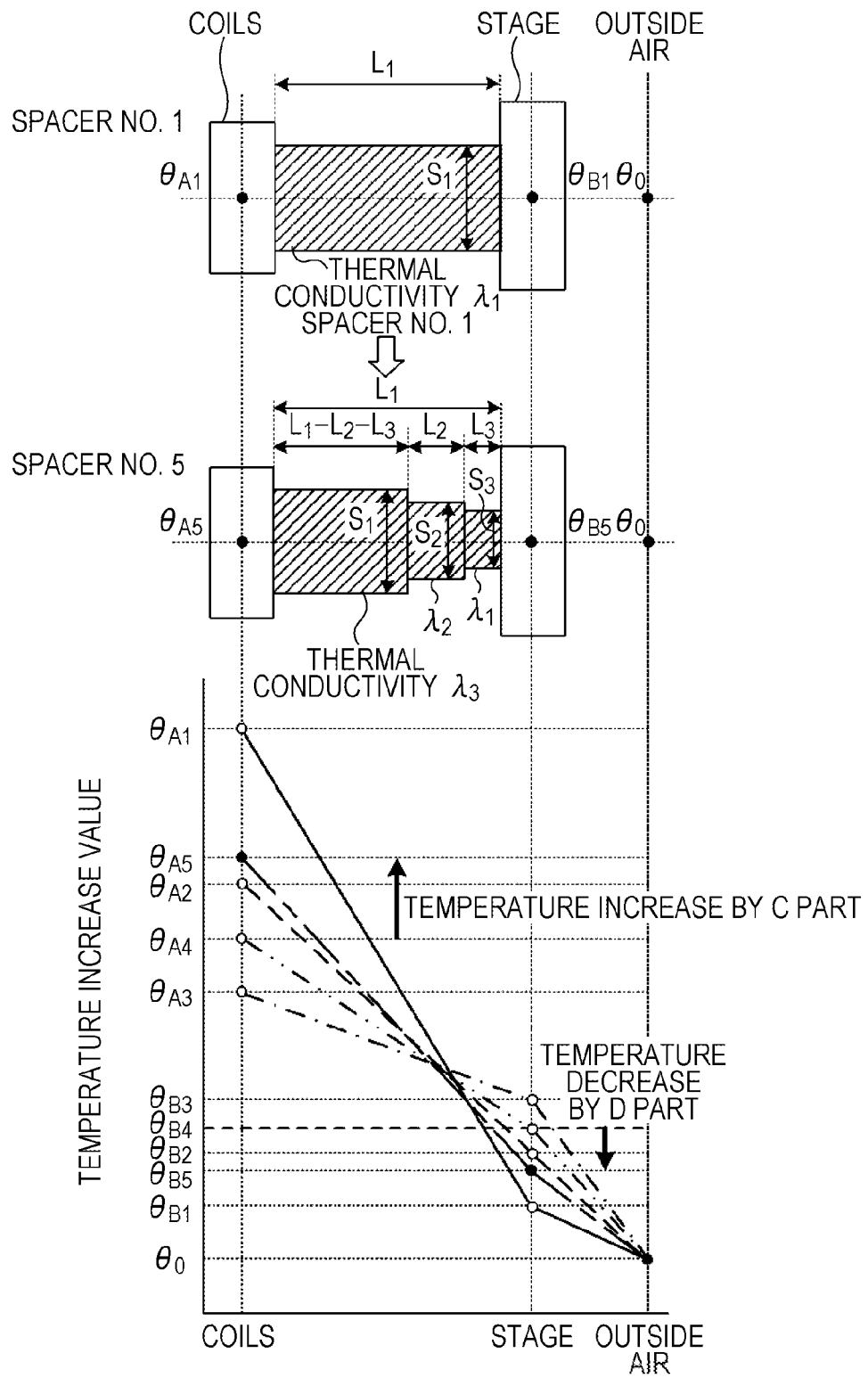
FIG. 12 is an illustrative diagram of temperature changes with a replacement of the spacer No. 1 (single member) by a spacer No. 5 (three members)

FIG. 9 is an illustrative diagram of temperature changes with a replacement of the spacer No. 1 (single member) by the spacer No. 2 (single member). FIG. 10 is an illustrative diagram of temperature changes with a replacement of the spacer No. 1 (single member) by the spacer No. 3 (single member). FIG. 11 is an illustrative diagram of temperature changes with a replacement of the spacer No. 1 (single member) by a spacer No. 4 (two members). FIG. 12 is an illustrative diagram of temperature changes with a replacement of the spacer No. 1 (single member) by a spacer No. 5 (three members).

As illustrated in FIG. 9, when the spacer No. 1 (single member) is replaced by the spacer No. 2 (single member), the amount of change in temperature increase value of the coils and the amount of change in temperature increase value of the stage are expressed by the following equations (9) and (10):

The amount of change in temperature increase value of the coils $$\Delta\theta_{A2A1} = \theta_{A2} - \theta_{A1} = \left(\frac{1}{\lambda_2} - \frac{1}{\lambda_1}\right) \times \left(\frac{L_1}{S_1}\right) \times Q \tag{9}$$

where $\lambda_2 > \lambda_1$ and thus $\Delta\theta_{A2A1} < 0$. Accordingly, the temperature increase value $\theta_{A2}$ of the coils becomes lower than $\theta_{A1}$.

The amount of change in temperature increase value of the stage $$\Delta\theta_{B2B1} = \theta_{B2} - \theta_{B1} = \left(-\frac{M_1 \cdot C_1}{M_2 \cdot C_2}\right)\left(\frac{1}{\lambda_2} - \frac{1}{\lambda_1}\right) \times \left(\frac{L_1}{S_1}\right) \times Q \tag{10}$$

where $\lambda_2 > \lambda_1$ and thus $\Delta\theta_{B2B1} > 0$. Accordingly, the temperature increase value $\theta_{B2}$ of the stage becomes larger than $\theta_{B1}$.

In addition, as illustrated in FIG. 10, when the spacer No. 1 (single member) is replaced by the spacer No. 3 (single member), the amount of change in temperature increase value of the coils and the amount of change in temperature increase value of the stage are expressed by the following equations (11) and (12):

The amount of change in temperature increase value of the coils $$\Delta\theta_{A3A1} = \theta_{A2} - \theta_{A1} = \left(\frac{1}{\lambda_3} - \frac{1}{\lambda_1}\right) \times \left(\frac{L_1}{S_1}\right) \times Q \tag{11}$$

where $\lambda_3 \gg \lambda_1$ and thus $\Delta\theta_{A3A1} \ll 0$. Accordingly, the temperature increase value $\theta_{A3}$ of the coils becomes lower than $\theta_{A1}$.

The amount of change in temperature increase value of the stage $$\Delta\theta_{B3B1} = \theta_{B3} - \theta_{B1} = \left(-\frac{M_1 \cdot C_1}{M_2 \cdot C_2}\right)\left(\frac{1}{\lambda_2} - \frac{1}{\lambda_1}\right) \times \left(\frac{L_1}{S_1}\right) \times Q \tag{12}$$

where $\lambda_3 \gg \lambda_1$ and thus $\Delta\theta_{B3B1} \gg 0$. Accordingly, the temperature increase value $\theta_{B3}$ of the stage becomes larger than $\theta_{B1}$.

On the other hand, as illustrated in FIG. 11, when the spacer No. 1 (single member) is replaced by the spacer No. 4 (two members), the amount of change in temperature increase value of the coils and the amount of change in temperature increase value of the stage are expressed by the following equations (13) and (14). The materials for the spacer No. 4 are SUS304 (thermal conductivity $\lambda_2$) and A5052 (thermal conductivity $\lambda_3$).

The amount of change in temperature increase value of the coils $$\Delta\theta_{A4A1} = \theta_{A4} - \theta_{A1} = \left(\frac{1}{\lambda_2} - \frac{1}{\lambda_1}\right) \times \left(\frac{L_1}{S_1}\right) \times Q + \underbrace{\left(\frac{1}{\lambda_2 \cdot S_2} + \frac{1}{\lambda_3 \cdot S_1}\right) \cdot L_2 \cdot Q}_{A \text{ PART}}$$

$$= \Delta\theta_{A3A1} + \underbrace{\left(\frac{1}{\lambda_2 \cdot S_2} + \frac{1}{\lambda_3 \cdot S_1}\right) \cdot L_2 \cdot Q}_{A \text{ PART}} \tag{13}$$

where $\lambda_3 \gg \lambda_1$, $\lambda_3 > \lambda_2$ and thus $\Delta\theta_{A4A1} < \Delta\theta_{A3A1}$. Accordingly, the temperature increase value $\theta_{A4}$ of the coils increase from $\theta_{A3}$ by A part.

The amount of change in temperature increase value of the stage $$\Delta\theta_{B4B1} = \theta_{B4} - \theta_{B1} = \left(-\frac{M_1 \cdot C_1}{M_2 \cdot C_2}\right)\left(\frac{1}{\lambda_3} - \frac{1}{\lambda_1}\right) \times \left(\frac{L_1}{S_1}\right) \times Q - \underbrace{\left(\frac{M_1 \cdot C_1}{M_2 \cdot C_2}\right)\left(\frac{1}{\lambda_2 \cdot S_2} + \frac{1}{\lambda_3 \cdot S_2}\right) \cdot L_2 \cdot Q}_{B \text{ PART}}$$

$$= \Delta\theta_{B3B1} + \underbrace{\left(\frac{M_1 \cdot C_1}{M_2 \cdot C_2}\right)\left(\frac{1}{\lambda_2 \cdot S_2} + \frac{1}{\lambda_3 \cdot S_1}\right) \cdot L_2 \cdot Q}_{B \text{ PART}} \tag{14}$$

where $\lambda_3 \gg \lambda_1$, $\lambda_3 > \lambda_2$ and thus $\Delta\theta_{B4B1} < \Delta\theta_{B3B1}$. Accordingly, the temperature increase value $\theta_{B4}$ of the stage decrease from $\theta_{B3}$ by B part.

In addition, as illustrated in FIG. 12, when the spacer No. 1 (single member) is replaced by the spacer No. 5 (three members), the amount of change in temperature increase value of the coils and the amount of change in temperature increase value of the stage are expressed by the following equations (15) and (16). The materials for the spacer No. 5 are PPS/GF4 (thermal conductivity λ1), SUS304 (thermal conductivity λ2), and A5052 (thermal conductivity λ3).
The amount of change in temperature increase value of the coils $$\Delta\theta_{A5A1} = \theta_{A5} - \theta_{A1} = \left(\frac{1}{\lambda_3} - \frac{1}{\lambda_1}\right) \times \left(\frac{L_1}{S_1}\right) \times Q + \quad (15)$$
$$\left(\frac{1}{\lambda_1 \cdot S_2} + \frac{1}{\lambda_2 \cdot S_1}\right) \cdot L_1 \cdot Q +$$
$$\left(\frac{1}{\lambda_1 \cdot S_3} + \frac{1}{\lambda_3 \cdot S_1}\right) \cdot L_3 \cdot Q$$
$$= \Delta\theta_{A5A1} + \underbrace{\left(\frac{1}{\lambda_1 \cdot S_2} + \frac{1}{\lambda_2 + S_2}\right) \cdot L_3 \cdot Q}_{C \text{ PART}}$$

where λ3>>λ1, λ3>λ2 and thus $\Delta\theta_{A5A1} > \Delta\theta_{A4A1}$. Accordingly, the temperature increase value $\theta_{A5}$ of the coil decreases from $\theta_{A4}$ by C part.
The amount of change in temperature increase value of the stage $$\Delta\theta_{B5B1} = \theta_{B5} - \theta_{B1} = \left(-\frac{M_1 \cdot C_1}{M_2 \cdot C_2}\right)\left(\frac{1}{\lambda_3} - \frac{1}{\lambda_1}\right) \times \left(\frac{L_1}{S_1}\right) \times Q - \quad (16)$$
$$\left(\frac{M_1 \cdot C_1}{M_2 \cdot C_2}\right)\left(\frac{1}{\lambda_2 \cdot S_1} + \frac{1}{\lambda_3 \cdot S_1}\right) \cdot L_2 \cdot Q -$$
$$\left(\frac{M_1 \cdot C_1}{M_2 \cdot C_2}\right)\left(\frac{1}{\lambda_1 \cdot S_2} + \frac{1}{\lambda_3 \cdot S_1}\right) \times L_3 \times Q$$
$$= \Delta\theta_{B5B1} + \underbrace{\left(\frac{M_1 \cdot C_1}{M_2 \cdot C_2}\right)\left(\frac{1}{\lambda_2 \cdot S_2} + \frac{1}{\lambda_3 \cdot S_1}\right) \times L_3 \times Q}_{D \text{ PART}}$$

where λ3>>λ1, λ3>λ2 and thus $\Delta\theta_{B5B1} < \Delta\theta_{B4B1}$. Accordingly, the temperature increase value $\theta_{B5}$ of the stage decreases from $\theta_{B4}$ by D part.

As in the foregoing equations (13) to (16), the multi-member spacer (with two or more members) makes it easier to adjust the amounts of temperature change in the A to D parts, as compared to the conventional single-member spacer.

Specifically, for the conventional single-member spacer, the changeable thermal resistance parameters are limited to the thermal conductivity of one of the three members and the dimensions (thickness, width, and length) of the spacer within the allowable range at the customer's side.

In contrast, at the multi-member spacer, the combination of members different in thermal conductivity increases the number of changeable thermal resistance parameters. As a result, the A to D parts capable of temperature increase or temperature decrease occur in the foregoing equations (13) to (16). By adjusting the parts capable of temperature increase or temperature decrease, it is possible to keep the temperature increase value of the stage within the customer's required specifications and reduce the temperature increase value of the coils.

<Advantages of the Multi-member Spacer>

FIG. 13 is an illustrative diagram of multi-member spacers included in the linear motor according to the first embodiment. The lengths and widths of the spacers No. 4 and No. 5 illustrated in FIG. 13 are set to be the same as those of the spacer illustrated in FIG. 5.

On the other hand, the dimensions of members of the spacers are varied so that the entire thicknesses of the spacers become 11.7 mm that is the same as the thickness of the spacers illustrated in FIG. 5. In the spacer No. 4, the thickness of the member of A5052 on the armature side is 6.0 mm, and the thickness of the member of SUS304 on the stage side is 5.7 mm. In the spacer No. 5, the thickness of the member of A5052 on the armature side is 4.0 mm, the thickness of the middle member of SUS304 is 4.0 mm, and the thickness of the member of PPS/GF4 on the stage side is 3.7 mm.

Figure 14:
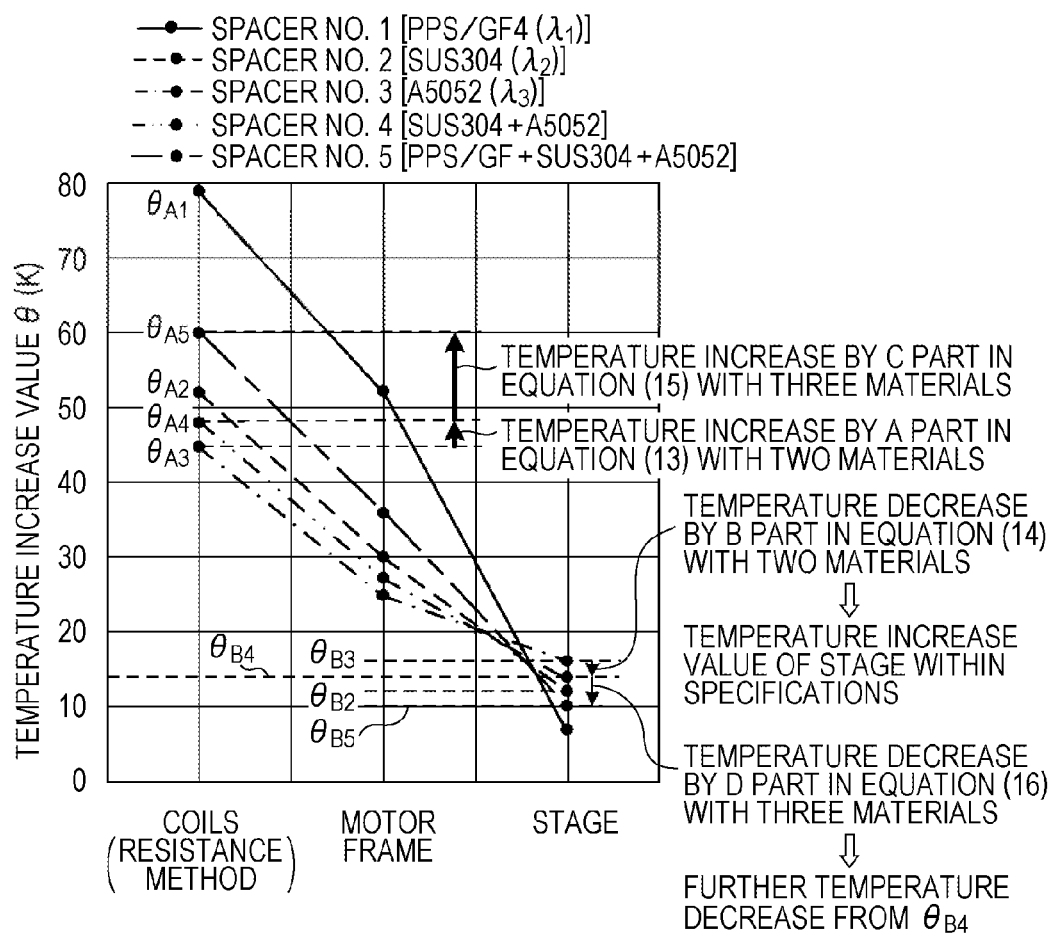
FIG. 14 is an illustrative diagram of temperature changes in the linear motor according to the first embodiment including the multi-member spacers.

FIG. 14 is an illustrative diagram of temperature changes in the multi-member spacers.

As illustrated in FIG. 14, the spacer No. 4 with members of two materials (A5052 and SUS304) decreases the temperature increase value of the stage to the required specifications unlike the single-member spacer No. 3. This is because the combination of the two members increases the number of thermal resistance parameters capable of adjustments to temperature increase or decrease, whereby temperature increase is reduced by the B part in the equation (14).

When a single-member spacer such as the spacer No. 2 of SUS304 is used, the coil temperature becomes high even if the temperature increase value of the stage falls within the required specifications. In addition, when the spacer No. 3 of A5052 is used, the temperature increase value of the coils becomes the smallest but the temperature increase value of the stage exceeds the required specifications. Therefore, it is difficult to find the shape of the single-member spacer so as to allow the temperature increase value of the stage to fall within the required specifications and reduce the temperature increase value of the coils by changing only the shape of the spacer.

On the other hand, according to the multi-member spacer, it is possible to control the amounts of temperature change corresponding to the A to D parts in the equations (13) to (16) by combining members identical in shape but different in thermal conductivity and varying the thicknesses of the members. By making adjustments to the A to D parts, it is possible to keep the temperature increase value of the stage within the required specifications and reduce the temperature increase value of the coils.

As described above, at the linear motor 100 according to the first embodiment, the spacer including two or more members different in thermal conductivity is interposed between the stage (subject to be moved) and the armature (mover). The difference in thermal conductivity between the members included in the spacer increases the number of parameters (thermal conductivity and dimensions of the members) for adjustment of thermal resistance between the coils and the stage (subject to be moved).

When the conventional single-member spacer is used, it is difficult to determine the optimum value of thermal resistance due to a very small number of parameters. In contrast, when the multi-member spacer is used, the number of parameters for thermal resistance can be increased to determine the optimum value of thermal resistance. As a result, by making adjustments to the amount of heat transferred from the coils to the stage, the temperature increase value of the stage satisfies the required specifications and the temperature increase value of the coils is reduced.

As described above, the linear motor according to the first embodiment includes the multi-member spacer 50 with two or more members different in thermal conductivity interposed between the armature (mover) and the stage (subject to be moved). The members included in the multi-member spacer 50 are arranged in such a manner that the thermal conductivity of the multi-member spacer 50 decreases sequentially from the armature (mover) to the stage (subject to be moved).

Accordingly, the linear motor 100 in the first embodiment has a simplified structure and makes it possible to suppress an increase in temperature of the stage (subject to be move) and reduce an increase in temperature of the mover coils.

In addition, the linear motor 100 according to the first embodiment realizes reduction in an increase of coil temperature, shortening of the development period, and lower initial costs, by making minor changes such as structure modification of the spacer.

[Second Embodiment]

Figure 15:
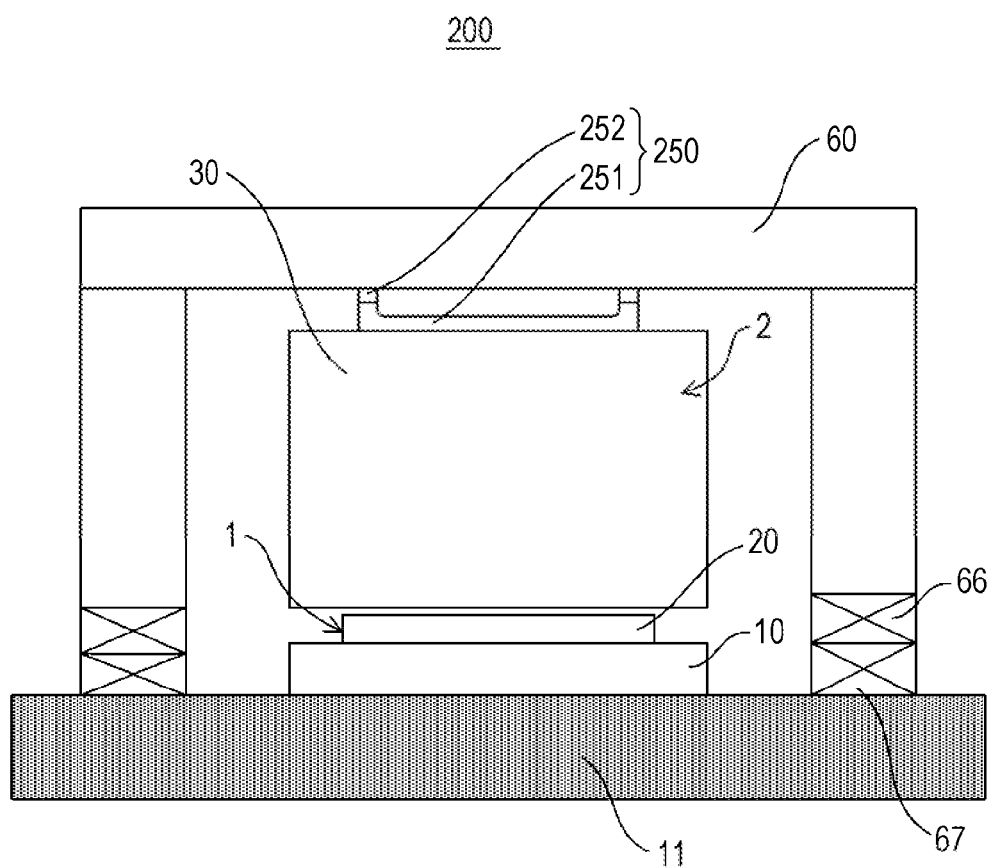
FIG. 15 is a schematic front view of a linear motor according to a second embodiment.
Figure 16:
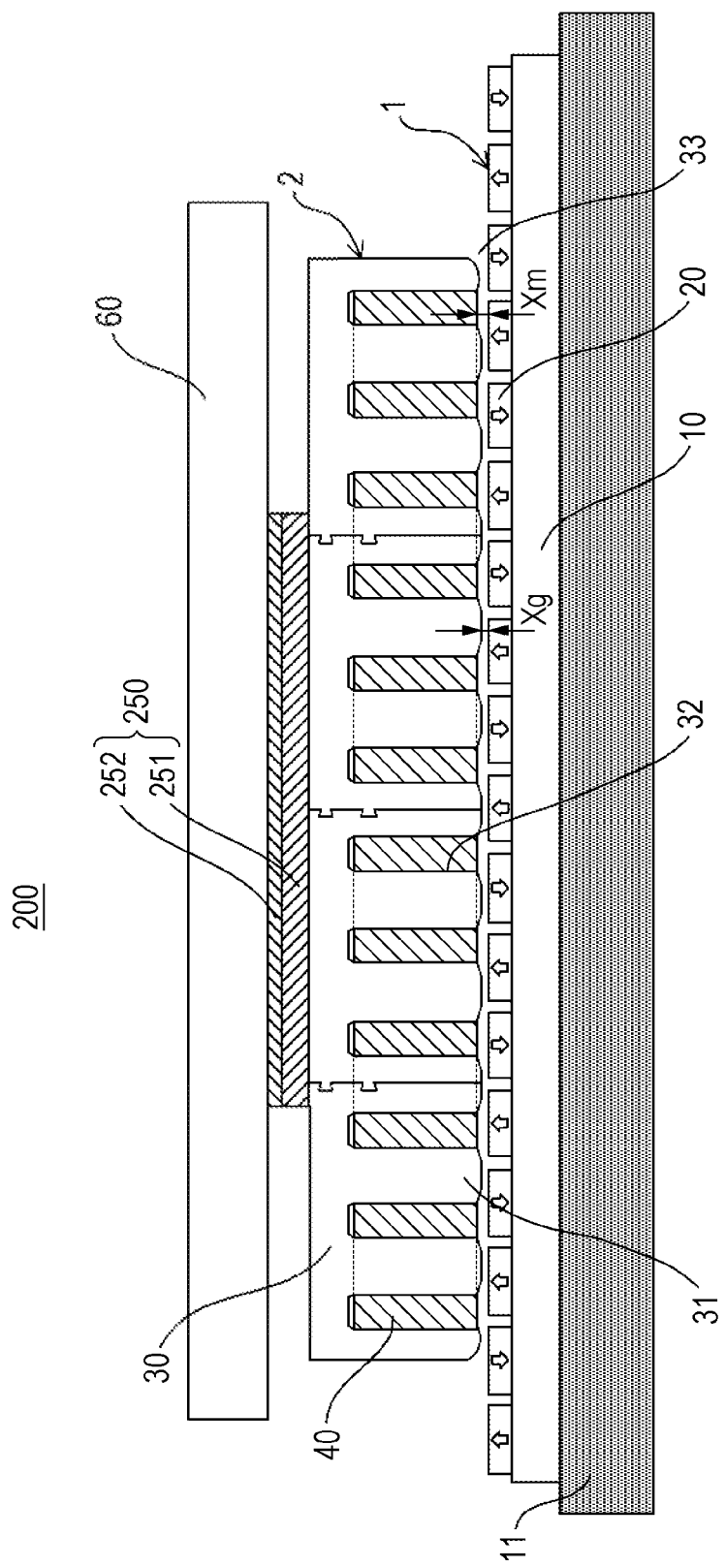
FIG. 16 is a schematic cross-sectional view of the linear motor according to the second embodiment.

Next, a configuration of a linear motor according to a second embodiment will be described with reference to FIGS. 15 to 18. FIG. 15 is a schematic front view of the linear motor according to the second embodiment. FIG. 16 is a schematic cross-sectional view of the linear motor according to the second embodiment.

At the linear motor 200 according to the second embodiment, a multi-member spacer 250 with two or more members different in thermal conductivity includes members of different shapes. In this respect, the linear motor 200 according to the second embodiment is different from the linear motor 100 according to the first embodiment. Specifically, at the linear motor 200 according to the second embodiment, the multi-member spacer 250 is entirely formed in a U shape. At the multi-member spacer 250, a concave plate-like member 251 is arranged on the armature 2 side, and two narrow plate-like members 252 are arranged on the stage 60 side.

FIG. 17 is an illustrative diagram of a multi-member spacer No. 6 including two or more members different in shape and thermal conductivity. As described in FIG. 17, the spacer No. 6 has a concave plate-like member (40 mm wide×84 mm long×10.7 mm thick) of an aluminum alloy (A5052) on the armature side, and two plate-like members (10 mm wide×84 mm long×1 mm thick) of a stainless steel (SUS304) on the stage side.

On the stage side, the area of contact between the stage and the spacer is decreased to suppress an increase in the temperature of the stage. The stainless steel used is low in thermal conductivity.

On the armature side, the area of contact between the armature and the spacer is increased to reduce an increase in the temperature of the coil. The aluminum alloy used is high in thermal conductivity.

Figure 18:
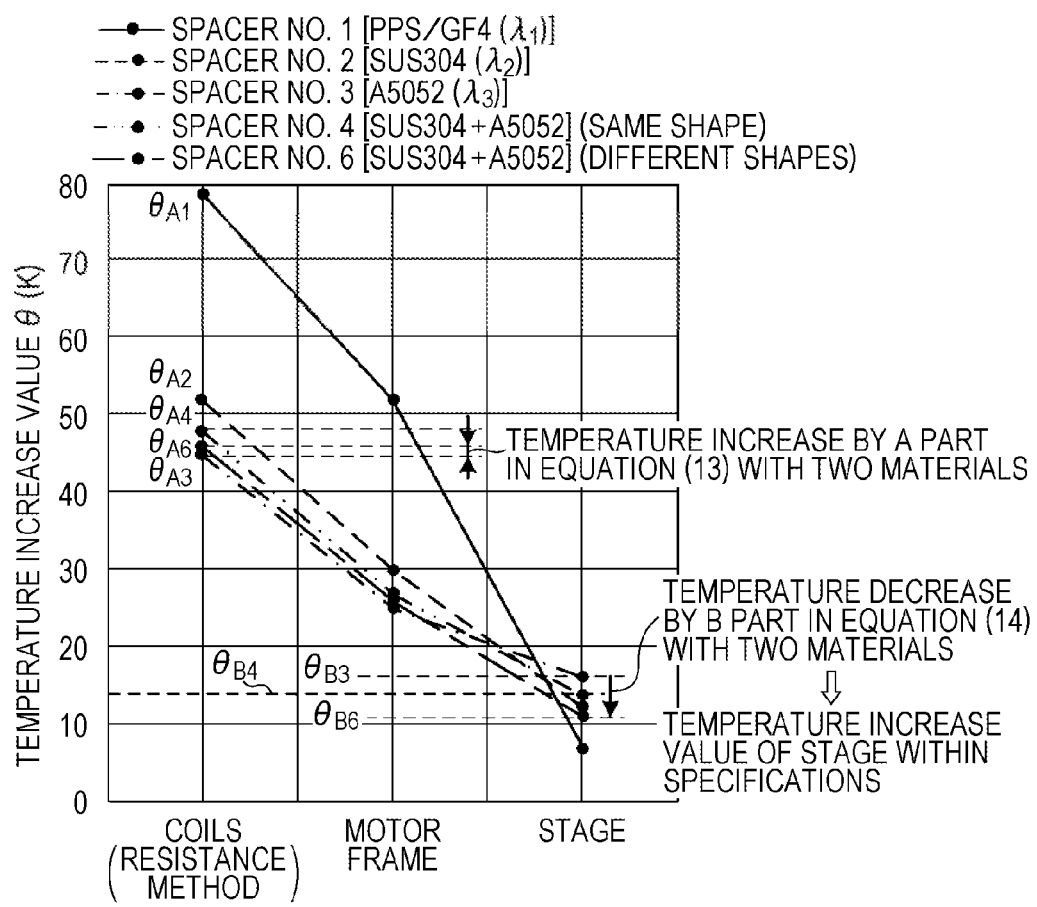
FIG. 18 is an illustrative diagram of changes in temperature increase of the linear motor according to the second embodiment that includes the spacer No. 6 with the members different in shape and thermal conductivity.

FIG. 18 is an illustrative diagram of changes in temperature increase with the use of the spacer No. 6 including two or more members different in shape and thermal conductivity.

As illustrated in FIG. 18, when the spacer No. 6 is used, the temperature increase value of the stage becomes lower than the temperature increase value of the stage when the spacer No. 4 is used.

In the equation (14), the two members different in thermal conductivity included in the spacer No. 4 have the same shape. Accordingly, their surface areas S1 and S2 satisfy the relationship S1=S2. Therefore, the number of adjustable thermal resistance parameters included in the B part of the equation (14) is three, thermal conductivities λ1 and λ2 and thickness $L_2$ of the members.

In contrast, the members included in the spacer No. 6 are different in shape and thus have the relationship S1≠S2. Therefore, the number of adjustable thermal resistance parameters included in the B part is five, thermal conductivities λ1 and λ2, surface areas S1 and S2, and thickness $L_2$ of the members.

As compared to the spacer No. 4, the spacer No. 6 including two or more members of different shapes increases the number of thermal resistance parameters to the extent that the amount of temperature change corresponding to the B part can be adjusted. As a result, by combining the materials of the optimum shapes, it is possible to reduce the temperature increase value of the stage and the temperature increase value of the coils as illustrated in FIG. 18.

The linear motor 200 according to the second embodiment provides the same advantages as those of the linear motor 100 according to the first embodiment.

In particular, according to the linear motor 200 in the second embodiment, the members included in the multi-member spacer have different shapes. This makes it possible to further increase the number of thermal resistance parameters from the armature to the stage. Accordingly, the linear motor 200 according to the second embodiment provides advantages in realizing further reduction in the temperature increase value of the stage and reduction in the temperature increase value of the coils.

As in the foregoing, preferred embodiments of the subject disclosure are described. However, the foregoing are mere exemplifications for explanation of the embodiments. The foregoing descriptions are not intended to limit the scope of the embodiments to these exemplifications. The embodiments can be carried out in various modes different from the foregoing ones without deviating from the gist thereof.

The linear motors according to the embodiments of the subject disclosure may be one of the following first to third linear motors.

The first linear motor includes: a stator that has a plurality of permanent magnets; and a mover that has a plurality of coils opposed to the permanent magnets and moves a subject to be moved linearly along the stator, wherein a multi-material spacer composed of two or more materials different in thermal conductivity is interposed between the mover and the subject to be moved.

The second linear motor is configured in such a manner that, it the first linear motor, the materials constituting the multi-material spacer are arranged so as to be lower sequentially in thermal conductivity from the mover to the subject to be moved.

The third linear motor is configured in such a manner that, in the first or second linear motor, the materials constituting the multi-material spacer are formed in different shapes or different dimensions.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A linear motor, comprising:
a stator;
a mover that moves a subject to be moved linearly along the stator; and a multi-member spacer that is interposed between the mover and the subject to be moved, wherein the stator includes a plurality of permanent magnets, the mover includes a plurality of coils arranged to be opposed to the permanent magnets, the multi-member spacer includes two or more members different in thermal conductivity, the plurality of coils is interposed between the plurality of permanent magnets and the multi-member spacer in a direction orthogonal to a moving direction of the mover, the mover comprises:
   a plurality of teeth protruded toward the plurality of permanent magnets;
   a plurality of slots defined by the plurality of teeth, the plurality of slots storing the plurality of coils; and
   a core closing upper ends of the plurality of the slots, the plurality of teeth being coupled together via the core, the core comprising an electromagnetic steel plate, the multi-member spacer is interposed between the core and the subject to be moved, one of the two or more members of the multi-member spacer is in direct contact with the subject to be moved, another one of the two or more members of the multi-member spacer is in direct contact with the core, and a contact area between the subject to be moved and the one of the two or more members is smaller than a contact area between the electromagnetic steel plate and the another one of the two or more members.

2. The linear motor according to claim 1, wherein the two or more members are arranged in the multi-member spacer such that thermal conductivity of the multi-member spacer is sequentially decreased from the mover to the subject to be moved.

3. The linear motor according to claim 2, wherein the two or more members have different shapes and dimensions.

4. The linear motor according to claim 1, wherein the two or more members have different shapes and dimensions.

5. The linear motor according to claim 1 further comprising:
   legs extended downward from a lower surface of the subject to be moved in a direction orthogonal to a moving direction of the mover;
   linear guides provided to lower portions of the legs; and
   tracks that extend in the moving direction of the mover and engage the linear guides.

6. The linear motor according to claim 1, wherein the multi-member spacer is in direct contact with the subject to be moved.

7. The linear motor according to claim 1, wherein the plurality of coils is located over the plurality of permanent magnets.

8. A linear motor, comprising:
a base;
a stator located above the base;
a mover that moves a subject to be moved linearly along the stator, the mover being located above the stator;
a multi-member spacer that is interposed between the mover and the subject to be moved, the multi-member spacer being located above the mover;
legs extended downward from a lower surface of the subject to be moved in a direction orthogonal to a moving direction of the mover;
linear guides provided to lower portions of the legs; and
tracks provided on the base that extend in the moving direction of the mover and engage the linear guides, wherein the stator includes a plurality of permanent magnets, the mover includes a plurality of coils arranged to be opposed to the permanent magnets, the multi-member spacer includes two or more members different in thermal conductivity, the plurality of coils is interposed between the plurality of permanent magnets and the multi-member spacer in the direction orthogonal to the moving direction of the mover, the mover comprises:
   a plurality of teeth protruded toward the plurality of permanent magnets;
   a plurality of slots defined by the plurality of teeth, the plurality of slots storing the plurality of coils; and
   a core closing upper ends of the plurality of the slots, the plurality of teeth being coupled together via the core, the core comprising an electromagnetic steel plate, the multi-member spacer is interposed between the core and the subject to be moved, one of the two or more members of the multi-member spacer is in direct contact with the subject to be moved, another one of the two or more members of the multi-member spacer is in direct contact with the core, and a contact area between the subject to be moved and the one of the two or more members is smaller than a contact area between the electromagnetic steel plate and the another one of the two or more members.

9. A linear motor, comprising:
a stator;
a mover that moves a subject to be moved linearly along the stator; and
a multi-member spacer that is interposed between the mover and the subject to be moved, wherein the stator includes a plurality of permanent magnets, the mover includes a plurality of coils arranged to be opposed to the permanent magnets, the multi-member spacer includes two or more members different in thermal conductivity, the plurality of coils is interposed between the plurality of permanent magnets and the multi-member spacer in a direction orthogonal to a moving direction of the mover, the mover comprises:
   a plurality of teeth protruded toward the plurality of permanent magnets;
   a plurality of slots defined by the plurality of teeth, the plurality of slots storing the plurality of coils; and
   a core closing upper ends of the plurality of the slots, the plurality of teeth being coupled together via the core, the core comprising an electromagnetic steel plate, the multi-member spacer is interposed between the core and the subject to be moved, one of the two or more members of the multi-member spacer is in direct contact with the subject to be moved, another one of the two or more members of the multi-member spacer is in direct contact with the core, a contact area between the subject to be moved and the one of the two or more members is smaller than a contact area between the core and the another one of the two or more members, the one of the two or more members of the multi-member spacer comprises two plate members, and the another one of the two or more members of the multi-member spacer comprises a concave plate member.

10. The linear motor according to claim 9, wherein the two plate members are two narrow plate members.

11. The linear motor according to claim 9, wherein the two or more members are arranged in the multi-member spacer such that thermal conductivity of the multi-member spacer is sequentially decreased from the mover to the subject to be moved.

12. The linear motor according to claim 11, wherein the two or more members have different shapes and dimensions.

13. The linear motor according to claim 9, wherein the two or more members have different shapes and dimensions.

14. The linear motor according to claim 9 further comprising:
    legs extended downward from a lower surface of the subject to be moved in a direction orthogonal to a moving direction of the mover;
    linear guides provided to lower portions of the legs; and
    tracks that extend in the moving direction of the mover and engage the linear guides.

* * * * *